United States Patent [11] 3,604,656

[72] Inventor Ashley J. Hollingsworth
48 Maganite Rd., Atherton, Calif. 94025
[21] Appl. No. 869,801
[22] Filed Oct. 27, 1969
[45] Patented Sept. 14, 1971
Continuation-in-part of application Ser. No. 773,843, Nov. 6, 1968, now abandoned.

[54] TAPE TRANSPORT APPARATUS AND CIRCULAR CARTRIDGE THEREFOR
14 Claims, 22 Drawing Figs.

[52] U.S. Cl. .......... 242/192, 242/198, 274/11
[51] Int. Cl. .......... G03b 1/04, G11b 15/32, G11b 23/04
[50] Field of Search .......... 242/192–201; 179/100.2 Z; 274/4, 11

[56] References Cited
UNITED STATES PATENTS

| | | | |
|---|---|---|---|
| 3,001,025 | 9/1961 | Gaubert | 179/100.2 |
| 3,161,361 | 12/1964 | Iida | 242/192 |
| 3,252,668 | 5/1966 | Miller et al. | 242/192 |
| 3,291,409 | 12/1966 | McClellan | 242/198 |
| 3,348,784 | 10/1967 | Gardiner et al. | 242/192 |
| 3,370,803 | 2/1968 | Newell | 242/192 |
| 3,526,406 | 9/1970 | Blackie et al. | 274/4 |

*Primary Examiner*—Leonard D. Christian
*Attorney*—Flehr, Hohbach, Test, Albritton & Herbert

ABSTRACT: Using a cartridge containing a roll of pliable recording tape wrapped upon a single hub and formed with a window at one side of the cartridge, a tape transport apparatus feeds the cartridge into the loading slot of a tape player for movement progressively into the slot during playing of the tape. Rewinding the tape causes the cartridge to emerge progressively outwardly from the slot of the tape player. A multiple tape deck machine employs a number of readily removable tape deck units, each of which is disposed upon an associated one of a number of drive elements.

INVENTOR.

Ashley J. Hollingsworth

BY Flehr, Hohbach, Test, Albritton & Herbert

Attorneys

INVENTOR.
Ashley J. Hollingsworth
BY Flehr, Hohbach, Test, Albritton & Herbert
Attorneys INVENTOR.
Ashley J. Hollingsworth
BY Flehr, Hohbach, Test, Albritton & Herbert
Attorneys

ASHLEY J. HOLLINGSWORTH
INVENTOR

BY Flehr, Hohbach, Test, Albritton & Herbert
ATTORNEYS

INVENTOR.
ASHLEY J. HOLLINGSWORTH
BY Flehr, Hohbach, Test, Albritton & Herbert
ATTORNEYS INVENTOR.
ASHLEY J. HOLLINGSWORTH
BY Flehr, Hohbach, Test, Albritton & Herbert
ATTORNEYS

INVENTOR.
ASHLEY J. HOLLINGSWORTH

BY Flehr, Hohbach, Test, Albritton & Herbert
ATTORNEYS

INVENTOR.
ASHLEY J. HOLLINGSWORTH
BY Flehr, Hohbach, Test, Albritton & Herbert
ATTORNEYS

TAPE TRANSPORT APPARATUS AND CIRCULAR CARTRIDGE THEREFOR

CROSS-REFERENCE TO RELATED APPLICATION

This application is a continuation-in-part application of U.S. Patent application Ser. No. 773,843 filed Nov. 6, 1968, and now abandoned entitled as above.

BACKGROUND OF THE INVENTION

This invention pertains to tape transport apparatus and more particularly to that type of tape transport apparatus wherein a length of pliable recording tape is wrapped to form a supply roll. The invention is particularly useful in providing tape transport apparatus of the type utilizing a cartridge containing the supply roll.

"Cartridges" are known of a style forming an envelope or container which substantially entirely surrounds a roll of pliable tape of a type used, for example, in magnetic recording or in photography.

Heretofore, magnetic tape players of a type utilizing tape cartridges have been generally classified in one or the other of two main categories, such as the type wherein a pair of hubs are supported within a single envelope and the roll of tape remains permanently threaded between the two rolls. Popularly, this style of cartridge is referred to as a "casette."

Another type of tape cartridge presently in popular usage contains a single roll of tape wound in an endless manner whereby a portion of the endless band of tape is brought to the outer edge of the cartridge container or envelope for engagement with a drive capstan. This style of cartridge may be referred to as a mobius or endless-loop cartridge.

As disclosed herein, however, a tape transport apparatus has been disclosed utilizing a length of pliable recording tape wrapped to form a roll within a cartridge container or envelope wherein an end of the tape is disposed at the outermost convolution of the roll in position to be withdrawn by a player. A window is formed on one side of the cartridge container for withdrawing the tape and threading it via the tape player and onto a takeup hub carried by the player. According to one embodiment, the takeup hub comprises the empty hub of a tape-cartridge container of the above novel style.

SUMMARY OF THE INVENTION

In general, there is provided herein a tape transport of the above type for feeding a compliant tape between supply and takeup rolls. Means for feeding the tape from the supply roll to the takeup roll have been provided as well as a tape cartridge container enclosing the single (supply) roll of the type wherein an end of the tape lies on the outermost convolution of the roll. During feeding of the tape to the takeup roll, the cartridge is urged to move progressively relatively toward the tape feeding means and, conversely, during rewinding of the supply roll, the cartridge gradually emerges from the tape player.

Further, means are provided for maintaining a proper tension in the tape being played while using principles disclosed in U.S. Pat. No. 3,370,803 or 3,370,804.

As described in the aforementioned patent, a rotating resilient-drive capstan is employed and the takeup roll is urged with a slightly greater force against the drive capstan than the force with which the supply roll is urged against the capstan. As disclosed herein, however, certain improvements have been made whereby the difference in the forces employed to urge the two rolls against the capstan may be adjusted simultaneously for both the supply and the takeup roll.

According to another embodiment of the invention, a multiple tape deck assembly comprises a plurality of readily removable decks disposed in playing position with respect to a multiple tape drive power takeoff chassis in which one or the other of a pair of continuously counterrotating drive spindles serves to operate the drive capstans of a plurality of associated decks. The drive capstans for the plurality of decks are arranged to be operated in one or the other of two opposite directions and at one of a plurality of selected speeds in either direction of operation. The speed change, while continuing to feed in the same direction, is effected by merely reversing a drive motor, common to all of the plurality of tape decks while coupling the motor to drive the decks via a second of two power trains.

OBJECTS

In general, it is an object of the present invention to provide an improved tape transport apparatus.

It is another object of the invention to provide a simplified and compact tape transport apparatus of the type employing a single roll of tape contained in a tape cartridge envelope to be fed to a takeup hub.

It is another object of the invention to provide a multiple tape deck machine wherein a plurality of tapes can be fed selectively in the same or opposite directions and at one of a plurality of speeds.

It is yet a further object of the invention to provide a simplified tape deck unit having a drive capstan flanked by tape-roll-container guide means permitting each container to advance and retreat during feeding of tape.

It is still another object to provide a tape-driver power-train unit whereby upon reversal of an electric motor the tapes will be fed at a considerably different speed but continue in the same direction.

The foregoing and other objects of the invention will become more readily apparent from the following detailed description of a preferred embodiment according to the invention.

DESCRIPTION OF THE PREFERRED EMBODIMENTS

Figures 1, 2:
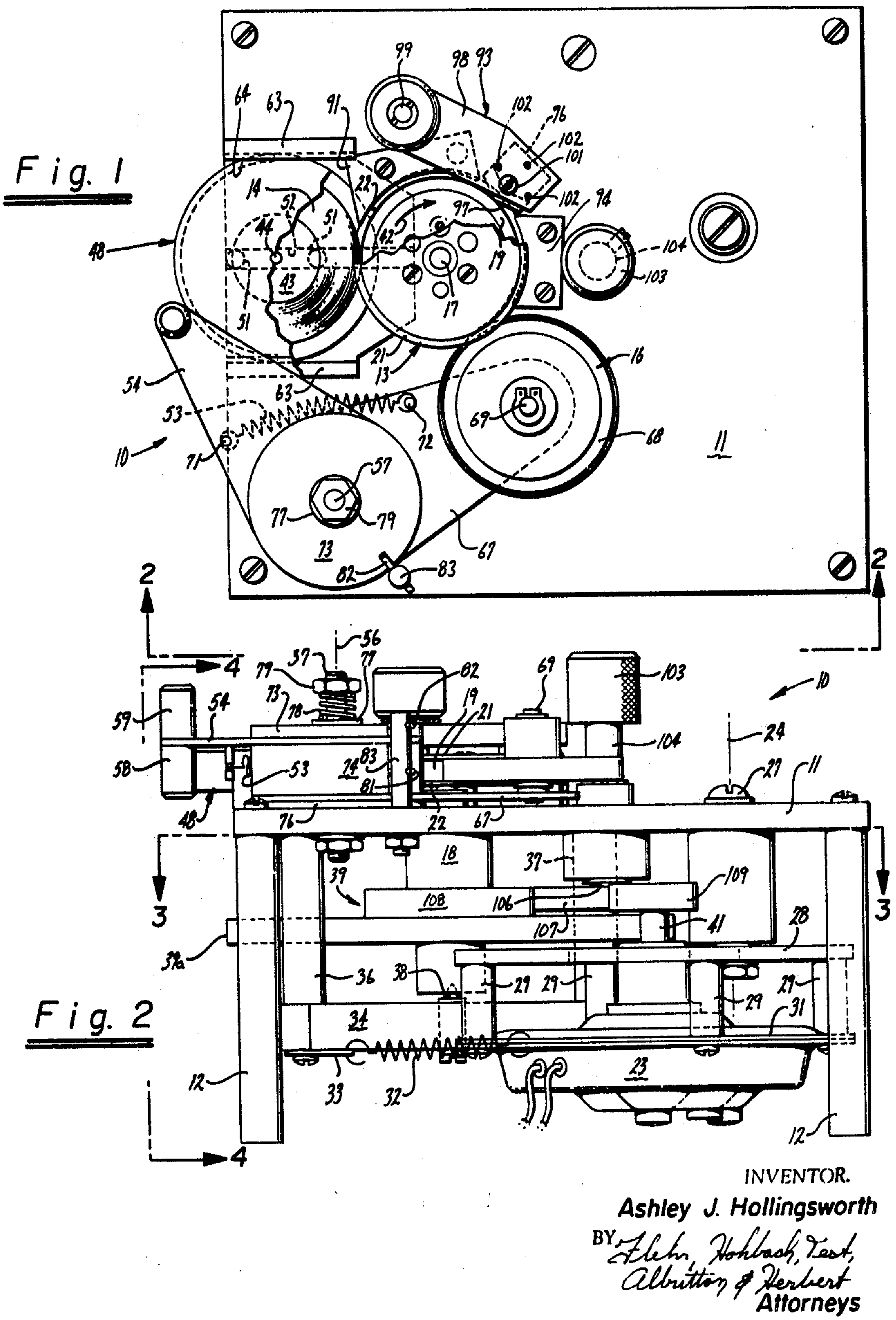
FIG. 1 is a plan view, partially broken away, showing a tape transport apparatus according to the invention.
FIG. 2 is an elevation view taken along the line 2—2 of FIG. 1.
Figure 3:
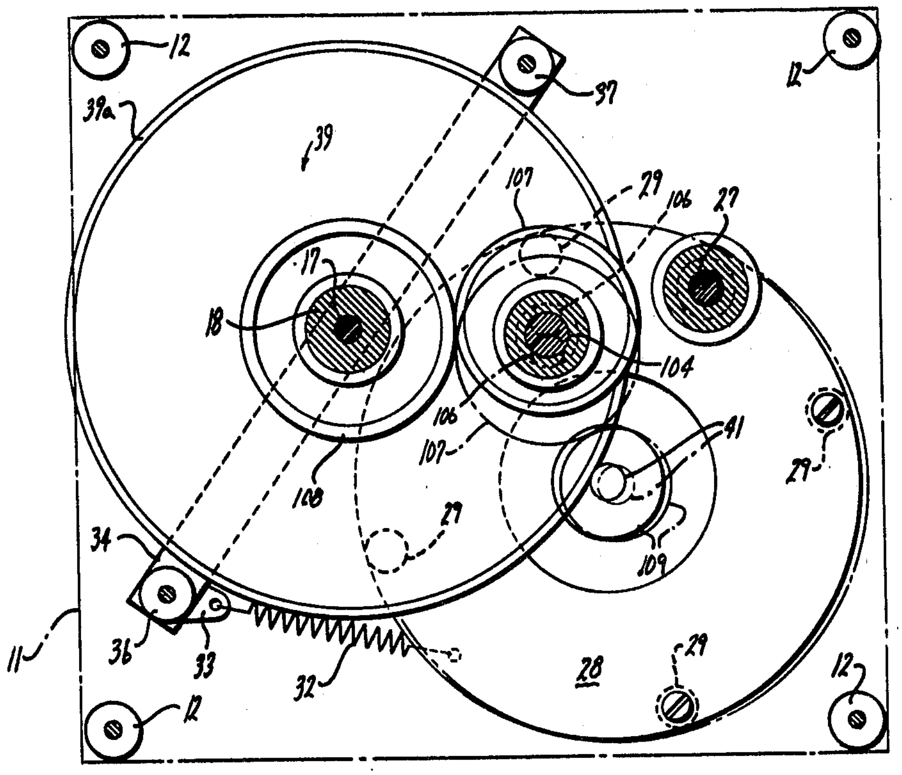
FIG. 3 is a plan view, in section taken along the line 3—3 of FIG. 2.
Figure 4:
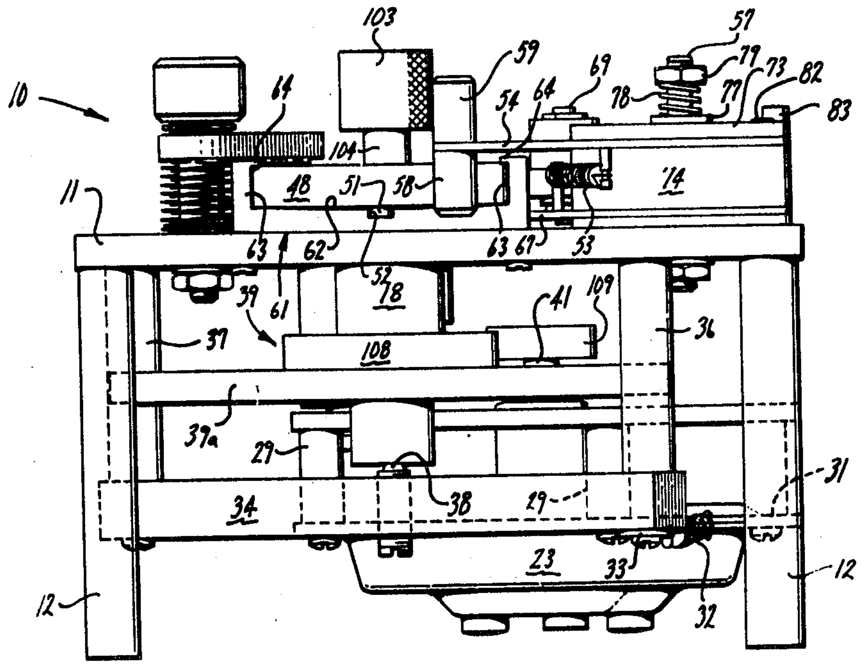
FIG. 4 is an elevation view taken along the line 4—4 of FIG. 2.
Figure 5:
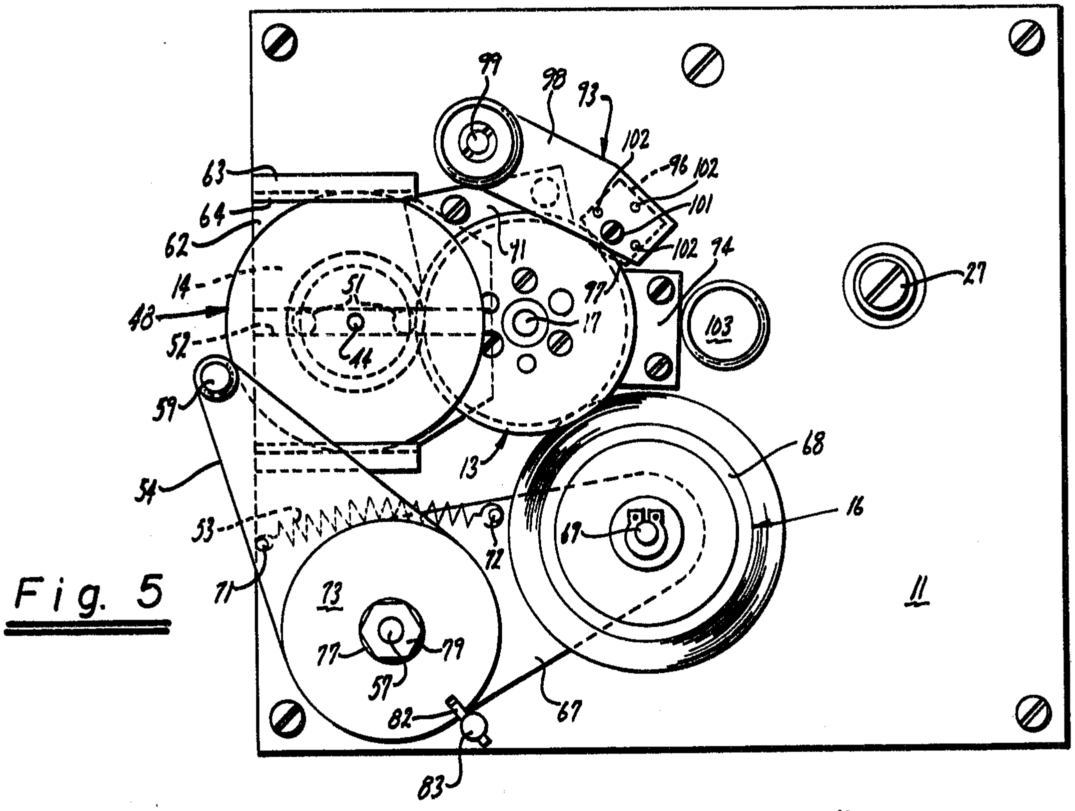
FIG. 5 is a plan view of FIG. 2 with invisibleportionsbelow top plate 11 omitted for clarity.

In general, the tape player 10 is built upon a deck plate 11 arranged to be supported by means such as legs 12 which serve to space plate 11 above a tabletop or other support surface. Deck plate 11 may also, of course, be supported within a suitable decorative cabinet or other conventional mounting structure.

An annular rotating resilient-drive body in the form of the capstan drum assembly 13 rotates in each of two opposite directions for feeding tape from a supply roll 14 to a takeup roll 16, or reverse.

More particularly, capstan 13 is mounted for rotation upon the upper end of a drive shaft 17 supported in a bearing 18 mounted conventionally beneath plate 11.

The peripheral surface of capstan 13 carries a resilient tire 19 flanked at its edges by flanges 21, 22.

Flanges 21, 11 are provided with a relatively thin edge for purposes described further below.

Means for driving capstan drum 13 via its drive shaft 17 comprises the relatively flat electric motor 23 supported to pivot about axis 24 defined by the support rod 26 such as machine bolt 27 provided with the usual nut and washers.

The assembly carrying motor 23 includes strengthening mounting plate 28 and a plurality of four downwardly projecting spacers 29 secured to the flange 31 formed about motor 23.

The motor assembly comprises of motor 23 and mounting plate 28 thus pivots as a unit about pivot axis 24 and is urged by a spring 32 leftwardly as shown in FIG. 2. Thus, the left end of spring 32 is anchored securely to a fixed tab 33 screwed to the underside of a diagonally extending fixed bearing support arm 34.

Two downwardly depending stationary legs 36, 37 secured at their upper ends to the underside of deck plate 11 serve to hold arm 34 in fixed position.

Bearing support arm 34 carries a vertically adjustable, threaded, baring point support element 38 which in turn serves to provide rotational support for a relatively large reduction gear assembly 39.

A relatively large diameter resilient tire portion 39*a* forms the periphery of reduction gear assembly 39 and normally rides in contact with the output shaft 41 of drive motor 23. Thus, rotation of portion 39*a* serves to rotate shaft 17 of capstan drum 13 in the direction shown by arrow 42 in FIG. 1.

Figures 6, 7:
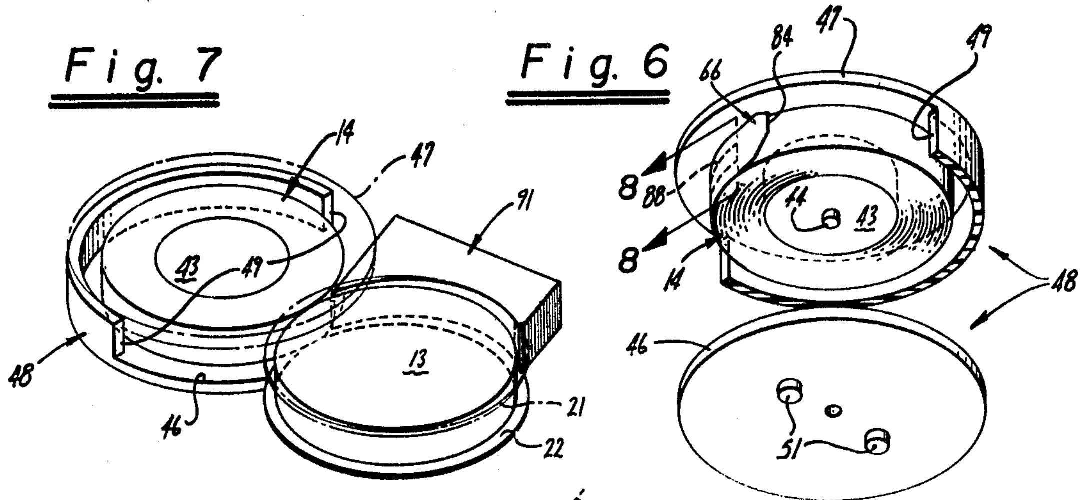
FIG. 6 is an exploded perspective view, in enlarged detail showing a roll of tape within a container according to the invention.
FIG. 7 is an enlarged detail perspective view showing a roll of tape positioned against the driving capstan, according to the invention.
Figures 8, 9:
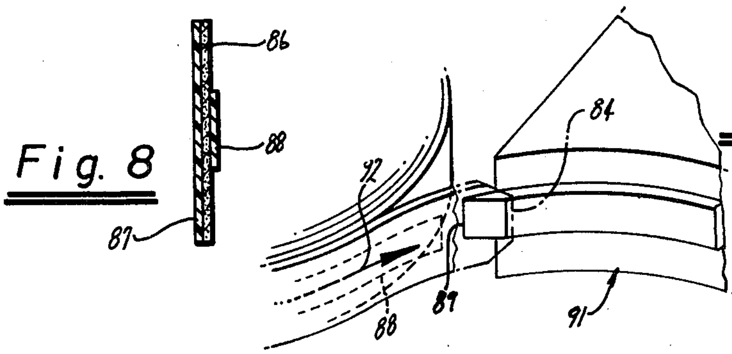
FIG. 8 is an enlarged section view taken along line 8—8 of FIG. 6.
FIG. 9 is an enlarged detail perspective view of a tape-peeling portion of the apparatus, according to the invention.
Figures 10, 11, 22:
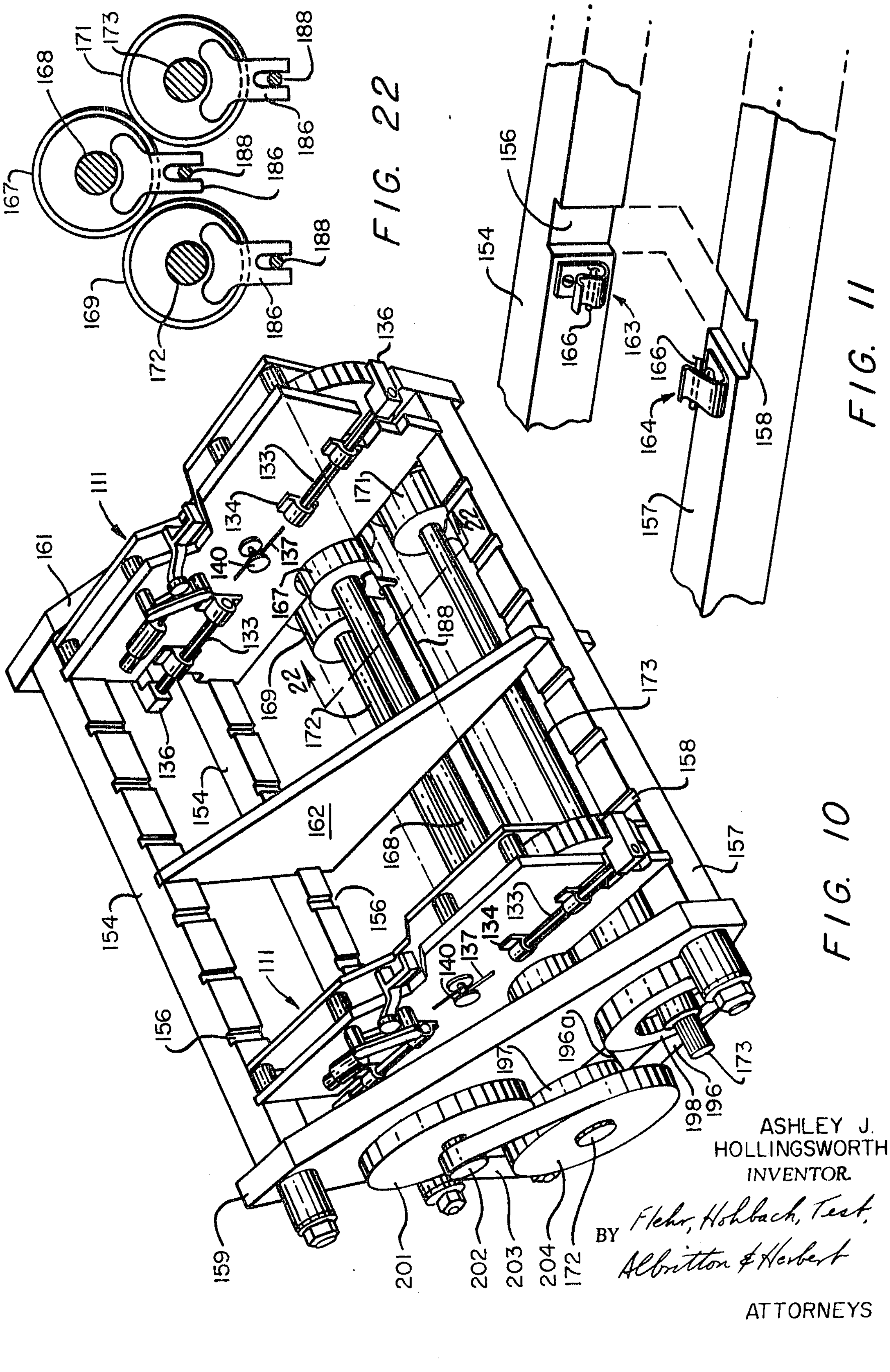
FIG. 10 is a perspective view of another embodiment showing a multiple tape deck machine with all but two decks removed, according to the invention.
FIG. 11 is an enlarged perspective detail showing means for releasably holding each deck in playing position within the machine of FIG. 10.
FIG. 22 is an elevation view, along line 22–22 of FIG. 10, showing a set of three clutches.
Figure 12:
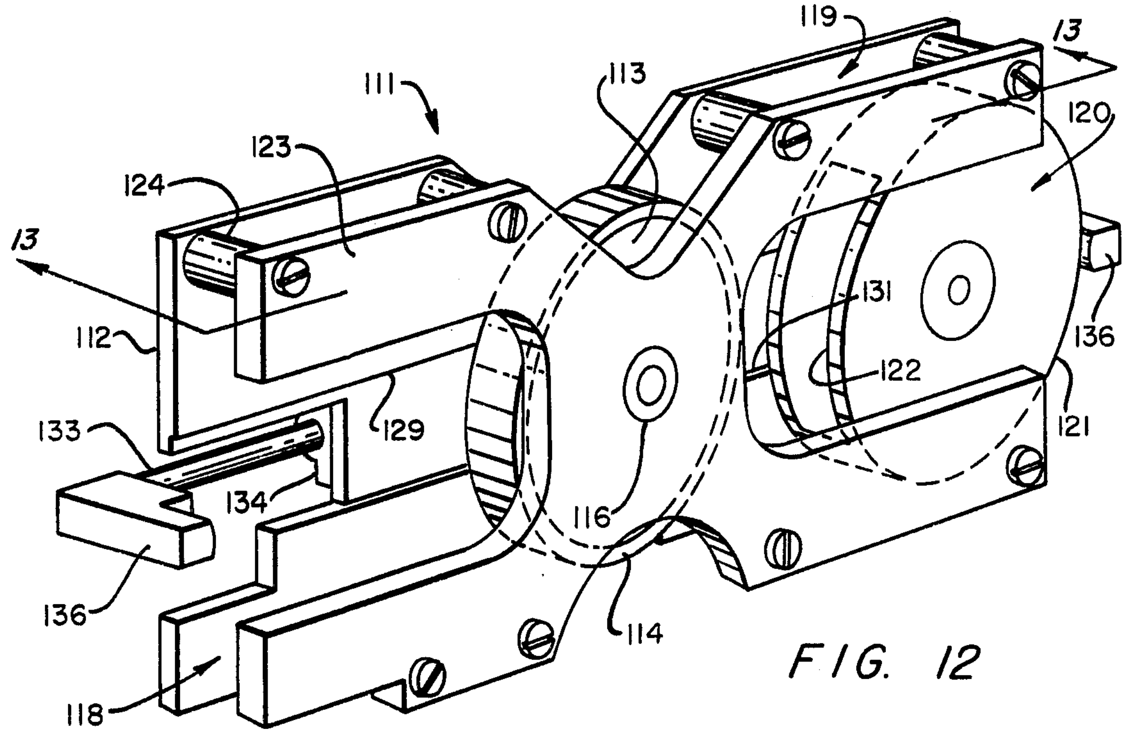
FIG. 12 is an enlarged perspective view of a tape deck for use in the machine of FIG. 10.
Figure 13:
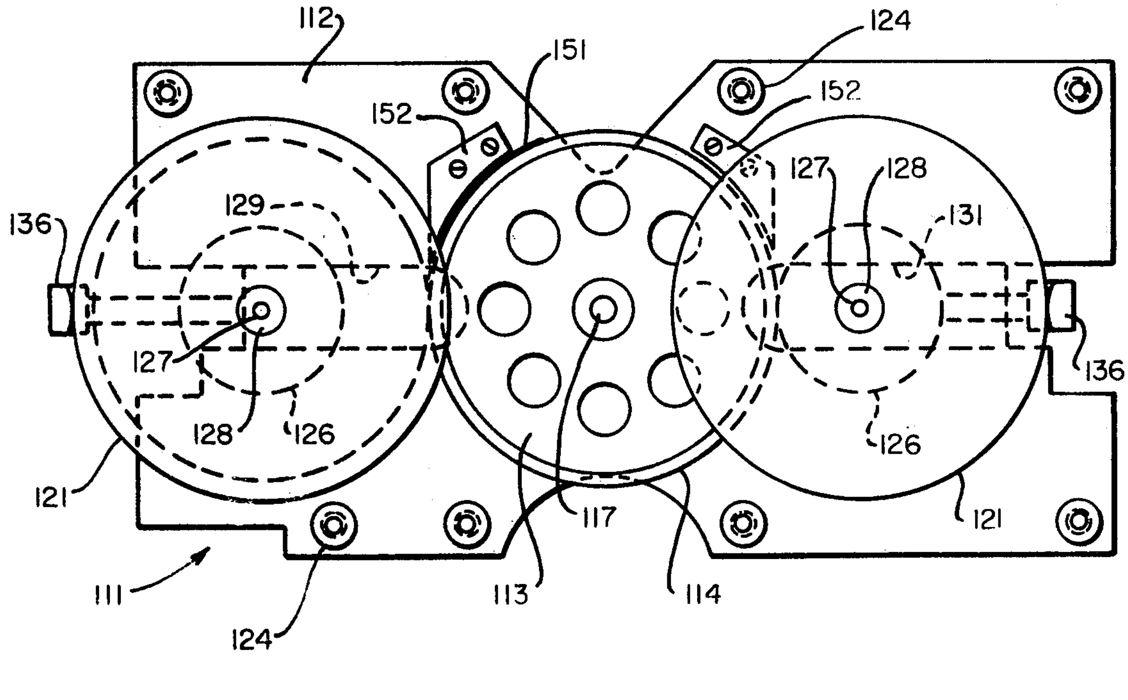
FIG. 13 is a side elevation view of the deck in FIG. 12 viewed along line 13—13 thereof.
Figure 14:
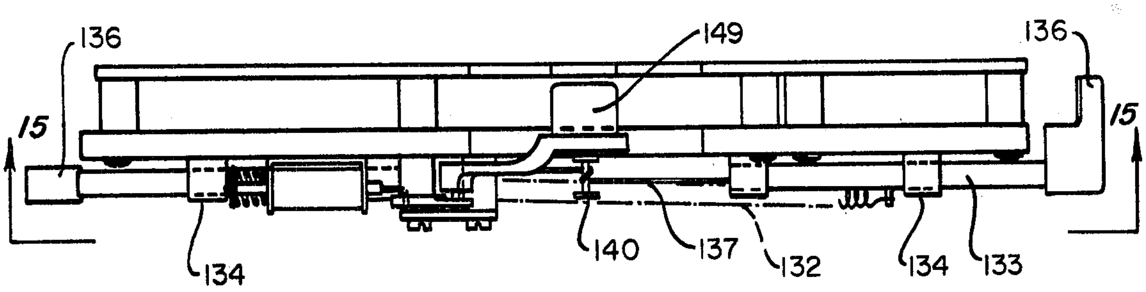
FIG. 14 is a top plan view of FIG. 13.
Figure 15:
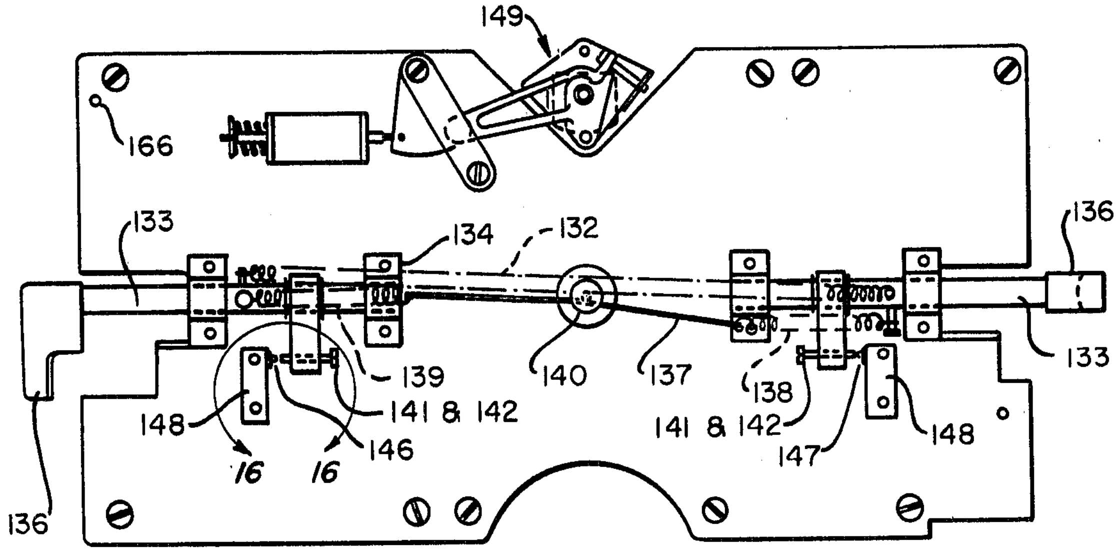
FIG. 15 is a side elevation view of the deck of FIG. 12 taken along the line 15—15 of FIG. 14.
Figure 16:
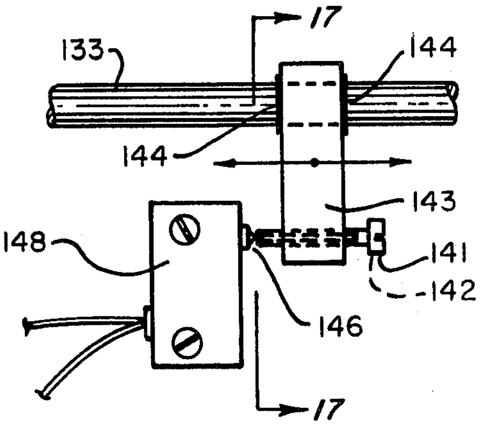
FIGS. 16 and 17 are respectively enlarged side and end elevation views taken in the area bounded by lines 16—16 of FIG. 15.
Figure 17:
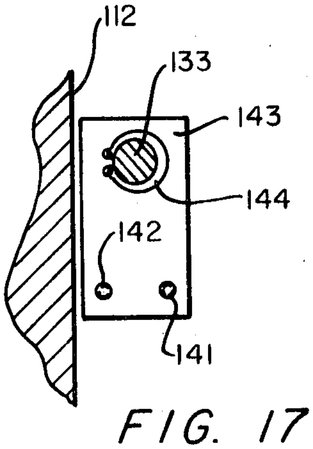
Figure 18:
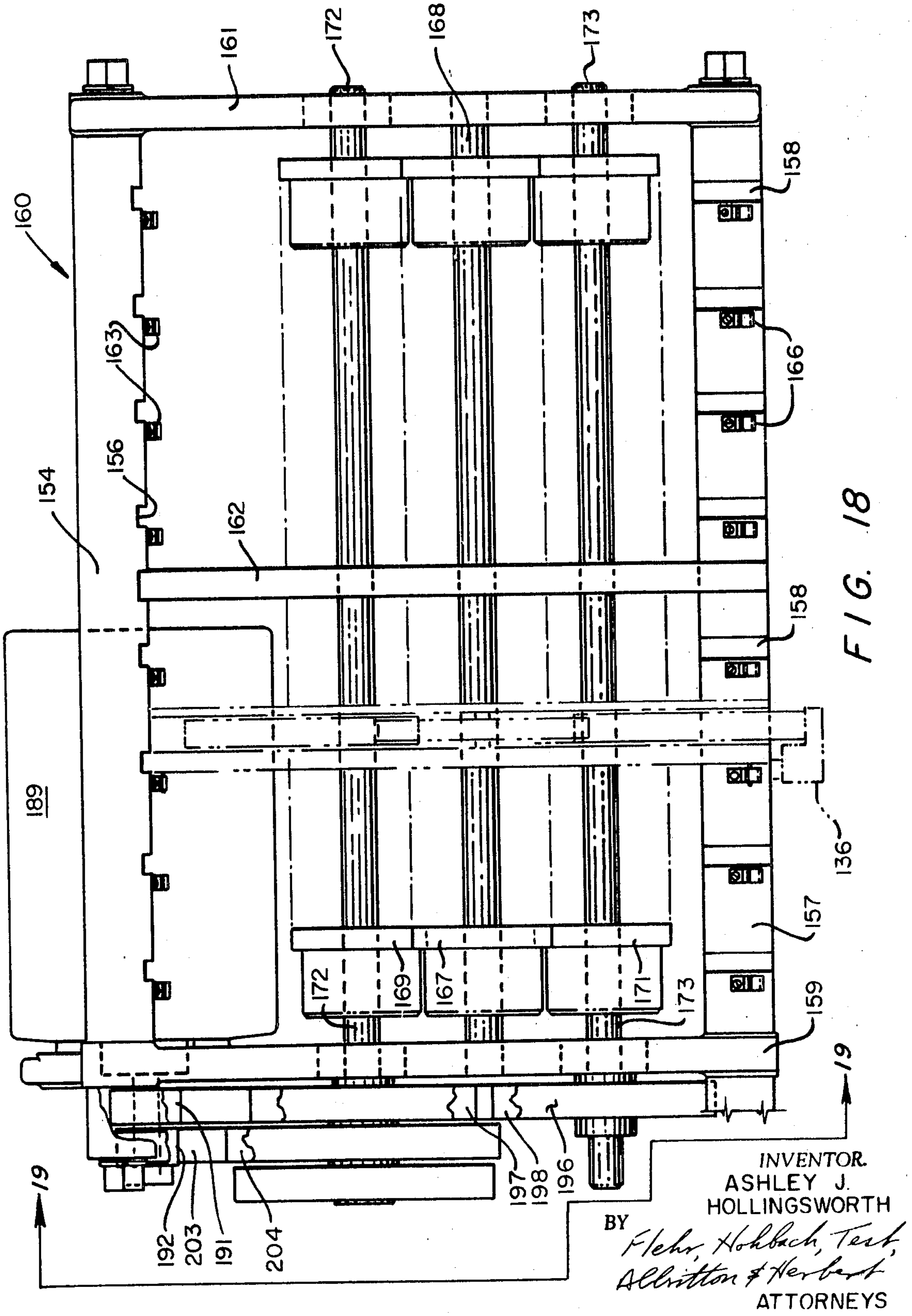
FIG. 18 is a plan view of the machine of FIG. 10 with decks removed.
Figure 19:
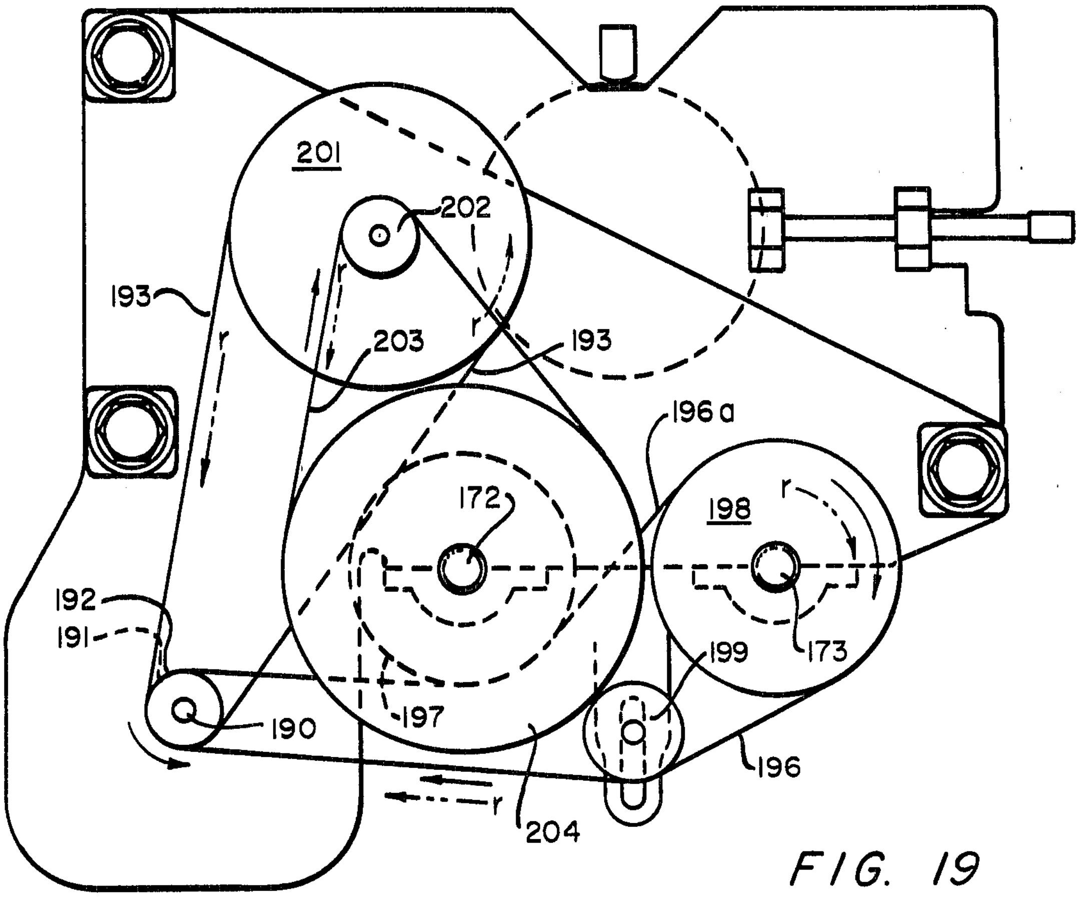
FIG. 19 is an end view of FIG. 18 along lines 19—19.
Figure 21:
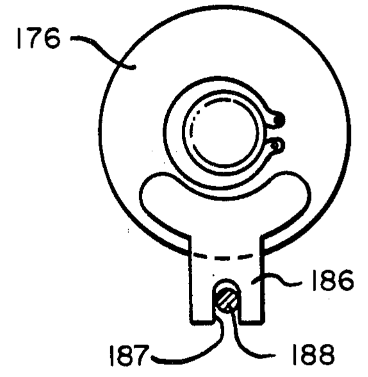
FIGS. 20 and 21 are respectively enlarged side elevation section and end elevation detail views of a clutch.
Figure 20:
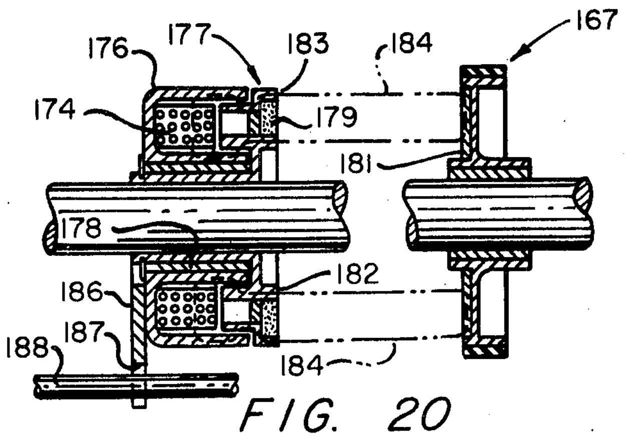

With reference to FIG. 6, the supply roll 14 is shown wrapped about a hub 43 which rotates upon an axle 44 journaled in the opposite side faces 46, 47 of a cartridge container or envelope 48. A window or access opening 49 extends about a portion of the periphery or side of cartridge container 48 to permit the withdrawal of tape from roll 14 as well as the entry of capstan 13 during feeding of tape.

Cartridge container 48 is made of a suitable rigid material, such as plastic, and includes a pair of guide pins 51 protruding laterally outwardly from side face 46 for cooperation with a guide slot 52 as now to be described for guiding cartridge 48 into and out of a loading slot or pocket to the cartridge-receiving zone formed by the receiver element 61 as explained below.

Supply and takeup rolls 14, 16, respectively, are arranged to advance and retreat relative to the rotating annular body defined by capstan drum 13 during feeding of tape, the supply roll diameter will become progressively smaller and will be urged toward capstan drum 13 while the takeup roll 16 will move progressively away from drum 13.

Supply roll 14, carried within cartridge container 48, is arranged to move guided longitudinally by guide slot 52 and is urged by means now to be described, including the biasing spring 53, in a direction extending toward capstan 13. Thus, a first swing arm 54 is supported for pivotal movement about an axis of rotation 56 as defined by the threaded pin 57.

The outer end of swing arm 54 carries a depending pressure element 58 and an upstanding retraction element 59 adapted to be grasped between the thumb and forefinger of a person loading the tape player with a cartridge container to be played.

Tape player 10 includes a zone in the form of a loading slot for receiving cartridge container 48 wherein container 48 is guided into engagement with capstan drum 13 and urged thereagainst by the depending pressure element 58 acting directly in contact against the exterior of cartridge container 48 thereby pushing same toward capstan drum 13.

Thus, the loading slot or receiving zone for container 48 is defined by the single receiver element 61 formed with a generally broad flat base portion 62 characterized by the guide slot 52 formed longitudinally therein and serving to cooperate with pins 51 to guide roll 14 directly toward the axis of rotation of drum 13.

Upstanding side portions 63, each formed with an overhanging lip 64, serve to contain cartridge 48 for slidable movement in advancing and retreating relative to the drive surface of capstan 13.

Means forming a takeup assembly have been located to automatically receive the leading end of the tape element 66 and to form same into a takeup roll 16. Thus, a second swing arm 67 has also been mounted for pivotal movement about the axis of rotation 56 and is also biased by spring 53 in a direction whereby its outer end is yieldingly urged capstan 13. The outer end of swing arm 67 carries a takeup hub 68 journaled for free rotation upon a spindle 69. Each of swing arms 54, 67 has been provided with an anchor pin 71, 72, respectively, for securing the opposite ends of spring 53 whereby spring 53 serves to draw both swing arms 54, 67 with equal force toward capstan drum 13.

Means are provided, however, whereby the force with which the supply and takeup rolls 14, 16 are urged against the resilient tire 19 of capstan 13 will be adjusted so that the force existing at the interface defined between capstan 13 and takeup roll 16 will be slightly greater than the compressive force found at the interface between supply roll 14 and capstan 13. The desirability of providing such a differential in the forces "across" capstan 13 is fully explained in the above-identified patent and need not be further elaborated on at this point other than merely to note that this force "differential", in conjunction with the resilient annular body provided by capstan tire 19, serves to provide proper tensioning of the tape filament as it passes from the supply roll to the takeup roll.

In U.S. Pat. No. 3,370,804, friction has been employed to vary the otherwise equal biasing force provided by a spring acting to urge the rolls against a tire. Thus, friction drag elements produce the force differential. However, as now to be described, the means for providing the force differential "across" the capstan 13 in the present embodiment is characterized by the fact that the assembly is variously adjustable in common with the supporting means for both the supply and takeup rolls so as to simultaneously adjust both the first and second forces acting upon their respective interfaces defined between the supply roll and capstan and the takeup roll and capstan.

Friction elements are provided whereby as each of the two swing arms 54, 67 pivots, frictional resistance act with respect to such pivoting so as to modify the biasing otherwise applied thereto by spring 53.

Swing arm 54 is thus mounted in a clamped position between a top friction plate 73 of plastic material and a central plate 74 of similar material. The bottom swing arm 67 is also in a clamped position located between a bottom friction plate 76 and the underside of central plate 74. Thus, each of swing arms 54, 67 is clamped firmly for sliding movement between a pair of friction plates of suitable plastic material by means of a spring-loaded washer 77 compressed by spring 78 which may be variously tightened by means of the nut 79 carried atop in 57. By increasing the compression applied to plates 73, 74 and 76, simultaneous compression is applied to each of the two swing arms 54, 67 so that the force generated by spring 53 becomes modified by an amount related to the drag of the friction formed between the pairs of clamped plates 73, 74 or 74, 76.

As explained in U.S. Pat. No. 3,370,804, although the force applied by spring 53 would normally be expected to provide an equal urging to each of the two rolls 14, 16, the force of friction involved in the movement of roll 14 serves to subtract from the force otherwise provided by spring 53 whereas the force of friction developed on the takeup side becomes effectively added to the force otherwise provided by spring 53.

Simply stated, as the enlarging takeup roll 16 attempts to grow in diameter as tape is fed to it, the force of friction serves to resist its lateral translation and, hence, increases the compressive force defined at the interface with capstan 13. On the other hand, as the diminishing supply roll 14 attempts to follow or advance toward the capstan 13, the resistance of friction serves to subtract from the force otherwise acting to urge the supply roll into engagement with the capstan.

Plates 73, 74, 76 remain stationary during pivoting of arms 54, 67. Plates 73, 74 and 76 are each provided with a radially disposed slot for receiving stationary pins such as pins 81, 82, carried in a fixed mounting post 83 supported from the upper surface of plate 11.

Means for automatically threading the leading end of tape element 66 from supply roll 14 to takeup roll 16 have been provided as now to be described.

Thus, referring to FIG. 6, the leading end 84 of tape element 66 is free to extend naturally away from the periphery of roll 14. A short distance rearwardly of end 84 the outermost convolution of roll 14 is adhered to the roll by means of marginal strips 86 of adhesive material. These are simply formed as a layer of adhesive material applied to the pliable magnetic record element 87. Then, centrally of the tape an antifriction strip of pliable plastic material, such as magnetic recording tape, forms the peeling strip 88 adapted to engage a peeling blade 89 formed on the face of a guide block 91.

Portions of guide block 91 can enter between the flanges 21, 22 of capstan 13 and blade 89 is adapted to intercept the naturally extended leading end 84 of a roll of tape as it is rotated in the direction of arrow 92. Upon intercepting leading end 84 of tape element 66, blade 89 serves to ride along the thicker antifriction surface portion provided by the peeling strip 88 and also to guide the tape in a path leading past a yieldingly supported transducer assembly 93, a secondary guide block 94, and then serves to dispose the adherent strips 86 in confronting engagement with the periphery of hub 68 for adhesive attachment thereto under the compression of capstan 13 so as to commence the formation of takeup roll 16.

Transducer assembly 93 includes a conventional transducer element 96 provided with a recording/reproducing gap 97 carried on a sufficiently narrow portion of transducer element 96 so as to fit easily between flanges 21, 22. Transducer 96 is supported on the distal end of a spring-loaded, pivotally mounted, support arm 98 adapted to pivot about an axle 99. Thus, screw 101 generally holds transducer element 96. However, three adjustable point-support pins 102 provide means for adjusting the orientation of gap 97.

Means are provided for quickly and readily changing the gear ratio and direction of operation of player 10 by means of the knurled control knob 103.

Thus, knob 103 stands upon the upper end of a control shaft 104 journaled in plate 11 and provided at its lower end with an eccentric link 106. The distal end of eccentric link 106 carries a rubber covered reversing/reduction gear 107 which can be moved into and out of engagement with the cylindrical boss portion 108 formed integral with the upper base of the large-diameter reduction gear portion 39*a* and also simultaneously into engagement with a drive wheel portion 109 formed as a somewhat enlarged diameter hub on drive shaft 41. Accordingly, by interposing the reversing gear action of reduction gear 107, manual rotation of knob 103 to an "over-center" position will provide a higher speed reverse rotation of capstan 13 than the forward drive speed otherwise provided for the same r.p.m. of motor 23.

Operation of the apparatus proceeds as follows, assuming that knob 103 is turned to provide a forward drive mode of operation.

A person, desiring to utilize the player for recording information on a roll of tape, or for playing back prerecorded information from the roll, first engages the retraction element 59 and draws it backwardly clear of its normally blocking position lying across the entry zone of the loading slot formed by receiving element 61. Orienting a cartridge container 48 with the guide pins 51 disposed beneath the cartridge to ride along guide slot 52, the cartridge is slidably moved into element 61 with the open window 49 disposed whereby tire 19 of capstan 13 can engage the periphery of the supply roll 14 carried inside. After releasing the retraction element 59, spring 53 draws pressure element 58 directly against the exterior of the casing of cartridge container 48 so as to urge roll 14 into compressive engagement with tire 19.

Next, drive motor 23 is energized by suitable means (not shown) whereby rotation of capstan 13 will proceed in the direction of arrow 42. This action, therefore, serves to rotate supply roll 14 in the direction of arrow 92 and upon engaging the free-standing outer end 84 of supply roll 14, the peeling blade 89 will engage same and release the grip of the outermost convolution of roll 14 and thereafter guide the leading end of tape element 66 past transducer 96.

Upon reaching transducer 96, the additional thickness provided by the central portion of the tape element 66 serves to space the recording gap 97 of transducer 96 clear of the adhesive margins 86 of the tape element 66. Ultimately, the adhesive margins will confront and be pressed against the periphery of takeup hub 68 whereby the compressive force provided by spring 53 causes the tape to adhere to takeup hub 68 and commence forming takeup roll 16.

A force differential for tensioning the tape upon tire 19 of capstan 13 is applied to the tape filament 66 being fed from supply to takeup rolls by means of the frictional engagement applied to the portions of swing arms 54, 67 by clamping each of the two swing arms respectively between a pair of friction plates 73, 74, and 74, 76.

As it becomes necessary to adjust the friction modulation of the bias force of spring 53 the degree of this clamping action may be simultaneously accomplished for each of the two swing arms 54, 76 merely by tightening a single nut 75 which serves to compress the spring 78. Spring 78 acts, of course, against a conventional washer 77.

As tape is fed in a "forward" mode, i.e., from supply roll 14 to takeup roll 16, supply roll 14 advances toward capstan 13 to takeup roll 16 retreats from capstan 13. Flanges 31, 22 flanking the resilient drive tire 19 extend radially beyond drive tire 19 and, accordingly, pass into cartridge container 48 via window 49 as the feeding of tape proceeds. Accordingly, a very small gap is provided between the side edges of the tape element 66 formed as a roll and side faces 46, 47 of cartridge container 48 to accommodate entry of the thin edge margins of flanges 21, 22.

From the foregoing, it will be readily evident that there has been provided an improved tape transport apparatus of a type suitable for reproducing prerecorded material or for recording information on tape as desired. Hence, the term "player" as used herein pertains not only to a tape-reproducing apparatus, but also to a tape-recording apparatus.

Further, the term "gear" has been used herein in its most general sense inasmuch as it is readily apparent that the "-gearing" as provided herein for driving the player is in the form of spools, drums, or hubs having high-friction surfaces cooperating with each other. This type of gearing is believed preferably in this type of apparatus over the use of gear teeth, but the invention is not to be restricted in any manner based on this usage of the term.

The foregoing tape player, accordingly, provides an improved arrangement whereby a tape cartridge of a type containing a single roll of tape having an end of the roll disposed on its outer periphery to be withdrawn from the cartridge may be readily handled and played. Further, the proper tensioning of such a tape has also been disclosed whereby forces are applied to the exterior of the tape cartridge containers to simplify handling of the apparatus and adjustment of the compressive forces used in tensioning the tape.

According to another embodiment of the invention, a tape transport machine has been provided employing a plurality of readily removable tape decks in a manner to beheld individually in playing position with respect to a multiple-drive power takeoff chassis in which one or the other of a pair of continuously counterrotating drive spindles serves to operate a drive capstan (carried by each of the decks) in one or the other of two opposite directions and at a selected one of two speeds in either direction of operation.

Each of the individual tape-deck assemblies 111 is characterized by its extreme simplicity and is built up from means in the form of a rigid baseplate 112 forming a frame or base for the deck assembly 111.

The deck's drive capstan 113 forms an annular resilient drive body, by means of a rigid capstan hub formed with a resilient tire 114 carried therearound. The capstan 113 is journaled for rotation centrally in baseplate 112. Thus, a journal bearing 116 rotatably supports the capstan shaft 117.

Each deck assembly 111 includes means forming a pair of loading zones 118, 119 each of which is adapted to dispose an associated one of a pair of tape roll containers 121 in substantially coplanar relation with respect to the resilient drive body provided by tire 114 for feeding tape from a roll within one of the containers 121 to a spool within the other container 121 via windows 122 in each container.

Accordingly, a relatively thin, rigid H-shaped front plate 123, is secured to spacer posts 124 to define loading channels between the confronting surfaces of baseplate 112 and front plate 123. The spacing between these confronting surfaces is sufficient to accommodate entry therein of the circular tape cartridge assembly 120 comprises of the hollow cylindrical tape roll containers each of which includes a spool 126 mounted for rotation therein upon a stationary axle 127 carried centrally of the container by frictional engagement with annular mounting washers 128 embedded respectively in the side faces of container 121. Each spool 126 is adapted to be wrapped with a length of pliable magnetic recording tape preferably formed with inner and outer end portions of a type described above whereby the innermost convolution of tape will engage and be secured to the periphery of the spool while the outermost convolution will include a portion adapted to be engaged and automatically threaded through the tape transport deck upon rotation of drive capstan 113.

Guide slots 129, 131 formed in the inside face of baseplate 112 serve to engage a pair of laterally protruding bosses disposed on a diameter of spool 126 so as to guide each of the spools 126 and their respective containers 121 during advancing and retreating movements of the cartridges 120 relative to the capstan 113 as tape is wound or unwound from a roll thereof.

As noted above, relative to the earlier noted tape cartridge construction in FIG. 6, each tape container 121 includes an open window 122, about a substantial portion of its periphery, of sufficient width to accommodate passage of capstan 113.

Each tape deck assembly 111 includes means for urging both of two tape cartridges toward the resilient surface of tire 114 but with a slightly greater force being applied to that cartridge 120 disposed on the takeup side of the tape transport deck assembly 111. This slight increase in the applied force at the takeup side serves to dispose the tape under slight tension as it passes from the supply to the takeup roll.

Accordingly, a single elongated helical spring 132 is anchored at its ends to crosspins disposed in the ends of rotatable guide rods 133 which, in turn, move in the direction of their length through guide bushings 134 of suitable material, such as one of the self-lubricating plastics presently employed.

Each guide rod 133 carries a retaining catch 136 fixed to one end whereby the catch extends transversely of the axis of a supporting rod 133 to an extent sufficient to engage the outer edge of an associated one of the two tape roll containers 121 when catch 136 and rod 133 are rotated into a retaining position. In this way with each of the retaining catches 136 engaging its respective cartridges 120, both will be urged toward the surface of tire 114. On the other hand, when it is desired to load or unload one or the other of the two ends of the tape deck assembly, the retaining catch 136 is merely rotated out of the plane of cartridge 120 to a position permitting it to pass clear of the catch 136.

In order to increase the force applied against that cartridge 120 disposed on the takeup side of tape deck assembly 111, a relatively inelastic cord 137 is wrapped about an axle extension spindle 140 of capstan 113 and held taut by connection at each of its ends to a spring 138, 139. The other ends of springs 138, 139 are by suitable means, for example, as by attaching to a crosspin carried by a respective one of the two guide rods 133. In this manner the tension in cord 137 remains substantially constant during feeding of tape since both rods 133 move at substantially the same rate and in a common direction.

From the foregoing, it will be readily apparent that capstan tire 114 passes into each of the two containers 121 for engaging the outermost convolution of tape on each of two rolls and upon rotation of the capstan serves to drive both the supply and takeup roll to feed tape.

By virtue of the difference in applied forces urging the two rolls against the resilient surface of the drive capstan, a modest tension is developed in the tape in that zone defined between the supply and takeup rolls. (See U.S. Pat. No. 3,370,803).

As tape is fed from the supply roll to the takeup roll, the supply roll will advance toward the capstan assembly while the takeup roll will retreat. This advancing and retreating movement serves, by virtue of the continuously applied contact by each of catches 136 (drawn together by spring 132) to cause the cartridges 120 to essentially follow these respective advancing and retreating movements.

Means are provided whereby indication is given of the approach of the end of the supply roll of tape. In addition, a second or followup means is provided serving as a fail-safe indicator for arresting further movement of the tape as it substantially reaches the end of the length of tape wrapped on the supply roll.

These warning signals are particularly useful, for example, in notifying a using machine or device, such as a computer, to inhibit further recording upon the tape at a portion of the tape where the arrival of the ultimate end of the tape is imminent. The second warning means mentioned is also utilized preferably with devices of the above type where it is desired that the tape remain on a predetermined assigned reel. Thus, upon sensing the second warning signal the feeding of further tape is arrested.

Accordingly, as the rods 133 advance and retreat with the movement of containers 121, a pair of independently adjustable contact points, such as the screws 141, 142 are carried by rods 133 from a laterally extending support block 143, and serve to operate respective microswitches at slightly different times. The side of blocks 143 rests upon and rides against the surface of baseplate 112 and is held at a predetermined axial location along its associated rod 133 by means of the pair of snap rings 144 clipped onto rod 133 adjacent opposite sides of block 143.

The adjustable screws 141, 142 are disposed in the path of the contact closure points 146, 147 of two microswitches 148 secured to baseplate 112.

In this fashion, one of the two microswitches 148 can be employed in circuit to provide a suitable warning that the end of the roll of tape is sufficiently near so that a utilization device should not avail itself of further portion of the tape. The other microswitch 148 can be employed by means described below to operate a braking device for arresting further rotative movement of the drive capstan tire 114. Means for applying a braking movement to tire 114 have been explained further below.

Finally, a magnetic transducer assembly 149 is shown schematically in a position to cooperate with tape wrapped about tire 114 as it proceeds from the supply to the takeup roll. Further description of this construction is believed unnecessary inasmuch as such transducer means will be well known to those skilled in the art.

Tape deck assembly 111, as disclosed herein, provides means for automatically threading a roll of tape from the supply roll past transducer assembly 149 and onto the spool 126 carried within its container 121 on the takeup side of the deck. Thus, the tape leader portion 151 of the roll of tape within container 121 rides initially against tire 114 and is rotated by engagement with the tire 114. The end of supply roll leader 151 engages a peeling blade 152 and is thereby withdrawn via window 122 of its associated cartridge container 121. Subsequently, the leader 151 passes via transducer assembly 149 and ultimately through window 122 of the takeup container 121 where leader 151 engages and wraps itself upon the spool 126 of the takeup container 121 so as to commence the formation of the takeup roll.

A multiple power takeoff chassis arrangement 160 cooperates with a number of tape deck assemblies 111 held in a rack arrangement whereby means are provided for simultaneously and independently operating a plurality of driving elements selectively in common or different directions. Further, the driving means employed with the power takeoff chassis assembly serves to provide a plurality of substantially different driving speeds of operation in a common direction simply by reversing the drive motor whereby a second of two power trains is called into operation.

The power takeoff chassis 160 includes means forming a rack for disposing the deck assemblies 111 in spaced planes and means readily releasably holding each of the assemblies 111 individually to the rack means for selectively removing individual ones of the assemblies 111 from the rack.

As thus arranged, a rack arrangement is formed by the framework comprising the spaced parallel rear alignment bars 154 formed at uniformly spaced intervals with detent notches 156 adapted to receive an end edge of baseplate 112.

A forward alignment bar 157 also includes a number of registration notches 158 adapted to receive the other end edge of baseplate 112. The three alignment bars 154 (2) and 157 are spaced to form the chassis by means of end plates 159, 161 and a center plate 162.

As thus arranged, each of a number of tape deck assemblies 111 can be disposed for operation on its edge loosely in the registration notches 156, 158.

Means are provided, however, for readily releasably, though firmly, holding each deck assembly 111 in its assigned disposition. Thus, a leaf spring latch element 163 is secured to the upper rear alignment bar 154 at a position adjacent each of the registration notches 156. Similarly, another leaf spring latch element 164 is disposed adjacent the registration notches 158 in the forward alignment bar 157. Retainer fingers 166 extend laterally from the face of each tape deck assembly at dispositions adapted to engage and be retained by their respective two associated leaf spring latches 163, 164. In this manner, a tape deck assembly 111 is held firmly in its associated registration notches 156, 158.

In the foregoing disposition, resilient tire 114 of each tape deck assembly 111 will rest directly upon an associated one of a plurality of rotating drive "pucks" 167 which is, in turn, arranged to be driven in one or the other of two opposite directions or braked all as now to be described.

Inasmuch as the driving of one tape deck assembly 111 is accomplished in the same manner as the driving of others of the deck assemblies, a single drive arrangement for one tape deck assembly will be described and comprises a rotatable resilient drive wheel, referred to hereinafter as a drive puck 167 carried for rotation upon and relative to a fixed shaft 168. The periphery of puck 167 rides in contact with one or the other of two counterrotatable resilient tires on wheels 169, 171. Wheels 169, 171 rotate freely upon and relative to their respective shafts 172, 173 except when they are electrically clutched to rotate with their respective drive shafts.

For example, each of the three wheels 167, 169 and 171 form the armature for, and are associated with, an electromagnetic clutch means adjacent thereto as now to be described.

An electric coil 174 is carried within a protective housing 176 disposed concentrically of a rotatable annular magnetic core portion 177. Core portion 177 is separated from the central portion of housing 176 by means of a self-lubricating bushing 178, such as manufactured from one of the self-lubricating plastics which are presently known in the art.

Each housing 176 is fitted with a radially outwardly protruding slotted tab 186 whereby the slot 187 of the tab is positioned to engage one of a number of associated anchor rods 188 serving to prevent the housing from rotating.

Core 177 is secured directly to its associated one of the three shafts 172, 173 and 168. Accordingly, where the shaft upon which core 177 is one of the two counterrotating drive shafts 172, 173, core 177 will always rotate with the rotation of the shaft upon which it is mounted. However, where core 177 is mounted upon the stationary shaft 168, it will remain stationary. Core 177 further includes an annular friction surface 179 confronting an annular planar drive surface 181 of an associated one of the three wheels 167, 169, 171. Each of the wheels 167, 169, 171 includes in its annular planar drive surface 181 an iron washer riveted or inserted by casting or staked to an aluminum backing or web of the wheel so as to form an armature adapted to be drawn to the inner and outer bounding rims 182, 183 of magnetic core portion 177. Thus, upon energization of coil 172, a magnetic flux path 184 is generated including an iron washer insert forming the engagement surface 181 whereby surface 181 magnetically attaches tightly to the core portion 177 and, hence, serves to lock wheel 167 or 169 or 171 (as the case may be) to its respective shaft. In the absence of energization of coil 174, wheel 167 (or the others) rotates freely upon its respective shafts.

Briefly, then, in operation, in order to operate drive puck 167 in a given direction, one or the other of the two drive wheels 169, 171 is electromagnetically locked tightly to its rotating core portion 177 whereby its associated counterrotating drive shaft 172, 173 will rotate the drive wheel 169, 171 to produce the desired direction of rotation of puck 167. Obviously, when one of the two clutch assemblies associated with wheels 169, 171 is energized, the other clutch assembly will be deenergized so as to permit the other wheel to rotate freely on its shaft. Also, the coil for the drive puck 167 will be deenergized.

Means are provided for driving the two drive wheels 169, 171 in counterrotating directions at a selected one of a plurality of speeds and also for braking the drive rotation of puck 167 and hence arresting the feeding of tape. Preferably, the two speeds which are employed are widely different, one being relatively high and one relatively low, whereby the high-speed operation can be employed to quickly thread all tapes onto their takeup rolls and thereafter to shift to a relatively slow speed operation while continuing to feed tape in the same direction simply by reversing the drive motor and shifting to a second power train as now to be described.

Means are provided for rotating the pair of shafts 172, 173 at either high or low speed and continuously in mutually opposite directions. To operate shafts 172, 173 at a high speed on the order of 120 i.p.s. (inches per second) an electric motor 189 is provided with an output shaft 190 which carries a pair of sheaves 191, 192 axially displaced relative to each other for driving separate belts 196, 193 respectively but formed with interlocking portions whereby when shaft 190 rotates clockwise (as shown) both sheaves 191, 192 rotate together for driving their belts 196, 193. When the motor shaft 190 is rotated in an opposite direction for a high-speed threading of tape, only sheave 192 is driven clockwise, and sheave 191 is permitted to idle relative to shaft 190, i.e., sheave 192 is decoupled from shaft 190 when the sheave 192 is rotated in the latter direction.

Accordingly, as shown in the drawing where the two sheaves 191, 192 are coupled by a unidirectional or overrunning clutch (not shown) of the above type so as to operate together in a clockwise rotation as shown, various directional arrows have been applied to the various belts and pulleys described further below pursuant to the following convention. For those conditions where motor 189 is operated in a reverse direction, the direction of the arrows has been applied to the drawings in phantom lines in association with a lower case letter *r*. Forward driving of motor 189 provides direction of movement shown by arrows in solid lines.

Briefly, the drive train construction includes a first cyclic belt 196, the upper reach **196*a* of which is trained around the lower periphery of a pulley 197. This contact between pulley 197 and reach 196*a* rotates the rear shaft 172 at high speed since pulley 197 is mounted directly to shaft 172**.

The same belt 196, trained around another pulley 198, rotates the forward shaft 173 in a direction counter to the direction of shaft 172.

An idler 199 is mounted to the frame and is adjustable to provide desired tension in belt 196.

Reversal of the direction of rotation of shaft 190 from motor 189 is used to reduce the speed of both shafts 172, 173 while they continue to rotate in their same directions as previously. This novel technique is employed to provide an extremely large speed reduction on the order, for example, of 8:1, for operation. In this mode, the unidirectional clutch or coupling provided between sheaves 191, 192 permits sheave 191 and belt 196 trained therearound to idle relative to shaft 190 so that only sheave 192 will be driven from motor shaft 190.

Belt 193 accordingly is driven by sheave 192 to rotate a relatively large pulley 201 counterclockwise to provide a large reduction from its central hub 202.

A further belt 203 trained between hub 202 and the large pulley 204 rotates the drive wheel pulley 204 counterclockwise at a relatively slow speed. This counterclockwise rotation serves to rotate shaft 172 in the same direction through the action of a unidirectional spring clutch (not shown) carried about shaft 172 between the confronting side faces of pulleys 204 and 197.

Accordingly, the spring clutch constitutes a unidirectional type of clutch wherein rotation of one of the pulley in a given direction will rotate the other pulley as soon as the slack in the spring as been taken up whereas reverse rotation will decouple the two pulleys relative to each other. Thus, in the present instance where pulley 204 is rotating in a counterclockwise direction, the spring clutch disposed axially between pulleys 197 and 204 serves to lock these two pulleys together and there will be a driving of pulley 197 from pulley 204. Hence, the upper reach of belt **196*a* moves at a speed determined by the rotation of pulley 204**.

It is to be observed that in both instances, whether the electric motor is driven in forward or reverse directions, belt 196 is moved in the same common direction in each instance. Reversal of drive motor 189 serves only to change the speed of movement of belt 196.

When belt 196 is driven by pulley 197 it will be apparent that sheave 191 must be unlocked relative to sheave 192 as has previously been explained. Thus, a continued movement of belt 196 in a given direction is shown by operation of pulley 197 through an extremely large speed reduction provided by the relatively large idler pulley 201. The relatively small hub 202, and the second relatively large driving pulley 204 serve to cause the forward shaft 173 to rotate relatively slowly in the foregoing manner.

In short, the counterclockwise rotation of pulley 197 serves to drive reach **196*a* of belt 196** in the same direction as previously but at a considerably reduced rate.

While high speed or low speed can be employed for any intended purpose, it has been found highly desirably to use the high-speed mode for threading the tape from supply to takeup rolls, and thereafter switching to operate the system in a low-speed mode of operation simply by reversing electric motor 189.

By employing the reduction system as described above, speed reduction on the order of 120 i.p.s. to 15 i.p.s. or at a ratio of 8 to 1 can be readily and simply achieved using inexpensive, conventional, reversible, electric drive motors 189.

From the foregoing, it will be readily apparent that there has been provided a magnetic tape transport deck of extreme simplicity which is readily usable with a multiplicity of other such tape decks operated from a common tape drive power takeoff.

The simplicity in handling tapes of the type described will also be readily apparent inasmuch as the loading and unloading of a roll of tape onto such a tape deck is simply achieved by merely sliding a tape cartridge assembly into the two channels formed at two ends of the deck assembly. Handling is thus considerably simplified inasmuch as the bearings for support of any given roll are carried with the roll of tape itself so that as the roll of tape is played upon any of a number of machines, errors in recording of the type caused by differences between the mounting bearings found in two different machines shall be eliminated.

I claim:

1. In a tape transport apparatus of a type for feeding a pliable tape wrapped to form a supply roll and having an annular rotating drive body for engaging said tape to feed same to form a takeup roll, a cartridge container enclosing said supply roll, a window formed in one side of said cartridge container for said body to drive said supply roll, means supporting said cartridge container to advance and retreat relative to said body during feeding of said tape, and means for urging said cartridge container to move the supply roll towards said body during feeding of said tape.

2. In a tape transport apparatus according to claim 1 further comprising a takeup hub for forming said takeup roll and disposed to advance and retreat with respect to said body during feeding of the tape, and wherein said means for urging said cartridge container further serves to urge said takeup hub toward said body during feeding of said tape.

3. In a tape transport according to claim 1 wherein said window accommodates entry of said body via same for driving said supply roll.

4. In a tape transport apparatus of a type for feeding a pliable tape wrapped to form a supply roll and having an annular rotating drive body for engaging said tape to feed same to form a takeup roll, and having a takeup hub for receiving and forming thereon said takeup roll, means supporting said supply roll to advance and retreat relative to said drive body during feeding of tape, means supporting said takeup roll to advance and retreat relative to said body during feeding of tape, means for yieldingly urging said supply and takeup rolls relatively toward said body during feeding of tape with first hand second forces respectively, the second force being greater than the first, the last-named means being variously adjustable in common with both of said supporting means to simultaneously vary both the first and second forces.

5. In a tape transport apparatus according to claim 4 further comprising an enclosed cartridge container carrying said supply roll for rotation therein, and said means urging the supply roll toward said body being arranged to act directly in contact against said container.

6. A tape transport apparatus according to claim 4 wherein said last-named means further includes first and second swing arms respectively acting to move said supply and takeup rolls relatively toward the body, said swing arms being pivotally disposed about a common pivot axis, friction plates on opposite sides of said swing arms, and means common to said pivot axis for compressing all said plates simultaneously to vary the friction of the plate acting upon said swing arms.

7. In a tape transport of a type for feeding a length of pliable tape wrapped to form supply and takeup rolls, a tape cartridge container enclosing the supply roll during feeding of tape, means for forming a takeup roll disposed outside the cartridge, means for feeding the tape from the supply roll to the takeup roll, and means serving to urge the cartridge container and supply roll to move relatively toward the feeding means during said feeding of the tape.

8. In a tape transport apparatus of a type for feeding a pliable tape from a supply roll to a takeup roll, a tape transport unit comprising means forming a generally planar support base, a resilient annular drive body rotatably carried by said base in substantially coplanar relation to the base, means forming a pair of loading zones each adapted to guide an associated one of a pair of tape roll containers in substantially coplanar relation to said body for feeding tape from within one of said containers into the other via a window in each container, means for urging said containers relatively towards said body to dispose the body in driving relation to rolls of tape within said containers via said windows, arcuate surface portions of said body being disposed for cooperating with an annular rotating drive member disposed in substantially coplanar relation to said body for driving the body to feed tape.

9. In a tape transport apparatus of a type for feeding a pliable tape from a supply roll to a takeup roll, a tape transport unit comprising means forming a generally planar support base, a resilient annular drive body rotatably carried by said base is substantially coplanar relation to the base for engaging and driving supply and takeup rolls at positions flanking said drive body including means forming a pair of loading channels disposed and adapted for respectively receiving an associated one of two individual tape roll containers having annular tape roll means therein, said channels serving to guide said containers to advance and retreat with respect to said body substantially in the plane of said body, means carried by said base for readily releasably engaging and urging said containers toward said body, and arcuate surface portions of said body being disposed and adapted both to carry tape wrapped therearound to cooperate with transducer means and to engage rotary drive means for driving said body to feed tape from one container to the other.

10. A tape transport machine comprising a frame, a plurality of tape deck assemblies carried by the frame, each said deck assembly including a support base, a resilient annular capstan body rotatably carried by the base, means forming loading channels flanking the capstan body for guiding tape roll containers to advance and retreat relative to said body, and means for urging a pair of tape roll containers along said channels towards said body to dispose rolls carried within the containers to cooperate in driving relation with said body, rack means for disposing said deck assemblies in spaced planes, means readily releasably holding said assemblies individually to said rack means for selectively removing individual ones of said assemblies from said rack means, and means for respectively rotating a plurality of said capstan bodies to feed tape.

11. A tape transport machine as in claim 10 wherein the last-named means includes a rotatably disposed plurality of annular drive wheels each respectively serving to engage an associated one of said capstan bodies, said rack means serving to dispose said deck assemblies with each of said bodies resting respectively on an associated on of said drive wheels.

12. A tape transport machine as in claim 10 wherein the last-named means includes rotary drive means common to all said deck assemblies, said rotary drive means including individual annular drive portions respectively disposed to engage and drive associated ones of the capstan bodies, and means for simultaneously and independently operating a plurality of said drive portions selectively in common or different directions.

13. In a tape transport machine of a type having a plurality of tape deck assemblies, each including an annular drive capstan and means for disposing supply and takeup rolls for transfer of tape from one to the other via said capstan, rotary tape drive means comprising a plurality of first annular drive elements and means supporting same for continuous rotation in a first predetermined direction, a plurality of second annular drive elements and means supporting same for continuous rotation in a second predetermined direction opposite to said first direction, a plurality of third annular drive elements selectively operable to be driven by either said first or second elements and serving to rotate said capstan selectively in one of two opposite directions in response thereto, a reversible electric motor for driving said elements and means serving to selectively couple said motor to drive said first and second elements in their respective predetermined directions at a first or second speed in response to operation of said motor in its forward or reverse mode of operation respectively.

14. In a tape transport machine as in claim 13 further including means for selectively braking the third drive elements to prevent inertial continuation of rotation thereof and of said capstan.